W. L. MARTIN.
RESILIENT WHEEL.
APPLICATION FILED MAY 11, 1908.
927,154.
Patented July 6, 1909.
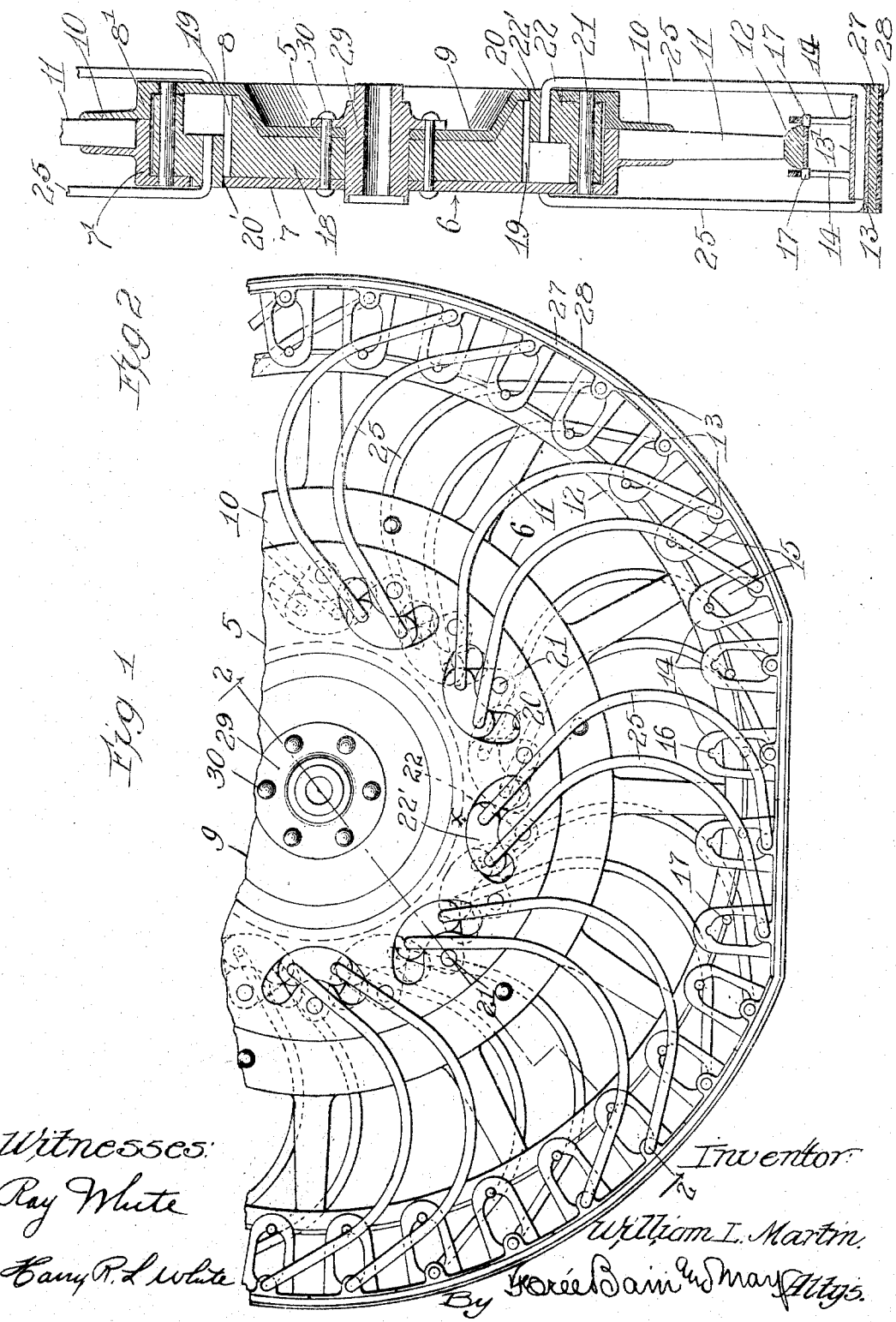

UNITED STATES PATENT OFFICE.

WILLIAM L. MARTIN, OF CHICAGO, ILLINOIS.

RESILIENT WHEEL.

No. 927,154. Specification of Letters Patent. Patented July 6, 1909.

Application filed May 11, 1908. Serial No. 432,310.

*To all whom it may concern:*

Be it known that I, WILLIAM L. MARTIN, a citizen of the United States, residing at Chicago, in the county of Cook and State of Illinois, have invented certain new and useful Improvements in Resilient Wheels, of which the following is a specification.

My invention relates to improvements in resilient wheels, and has for its primary object to provide a resilient wheel which will at all times afford a long effective bearing surface of considerable area, adapted to the configuration of the road surface on which it operates, but otherwise presenting a round perimeter.

A further object of my invention is to provide such a wheel wherein the active bearing surface is spring connected with a central frame to carry the load, but wherein the rim is at all times locked against rotative movement upon the load carrying frame, so that the wheel combines rigidity to resist applied torque, and resiliency in carrying the load, so that it is especially advantageous as a traction wheel.

Yet another object of my invention is to provide a wheel of the character described, wherein successive end-abutting sections of the rim are interconnected for equalization of pressure thereon in bearing the load.

Other and further specific objects will become apparent to those skilled in the art from the following description, and it will be understood that in general an object of my invention is to provide a practical, durable, simple and effective wheel, readily applicable to many classes and constructions of vehicle.

In the drawing; Figure 1 is a side elevation of a portion of a resilient wheel embodying my invention, and; Fig. 2 is a central cross-section on line 2—2 of Fig. 1.

In the drawing 5 indicates in general a frame structure, which may be made up in various ways in practice, said frame being generally a circular structure of rigid construction of somewhat less than the full diameter of the wheel.

In the particular construction shown, the frame 5 consists of a central body 6, made up of two plates 7 and 8, the latter being preferably dished as at 9 adjacent its center, said plates 7 and 8 having inturned flanges 7' and 8' coacting to form a band completely around the body 6 and coacting to form spoke sockets 10—10 of which any suitable number may be provided to carry rigid spokes 11, which support a rigid ring 12 of somewhat less diameter than the wheel.

The rim of the wheel is made up of end abutting sections, 13, preferably in the form of metallic plates adapted to jointly form a continuous circular rim, said plates being connected to the ring 12, as a suitable part of the frame 5, to stand normally in position to constitute parts of a circular rim, maintained against rotary movement with relation to the frame, and yet yielding with respect to rigid frame on radial or nearly radial lines. To this end a suitable number of the rim sections, 13, or every section, as shown, is provided with a pair of inwardly projecting rigid arms, or connectors, 14—14, each provided with a loop opening 15 having a narrow top recess 16, said loops engaging studs or projections 17—17 upon opposite sides of the ring 12 to limit the outermost position which may be assumed by the rim sections.

Strong springs are provided for maintaining the rim sections normally in their outermost position, so it will be seen that the rim as a whole stands normally circular and is rigidly carried in rotation by the solid frame so that it has no rotative play or movement with reference thereto, but that at the same time, within the range limited by the confines of the loops 15, each rim section may be moved inward radially or nearly radially.

I prefer that the springs provided for maintaining the rim sections normally in outermost position shall be arranged in pairs, connected to adjacent rim sections, and interconnected by a movable bearing block, or compensator, connected to the rigid frame, in such manner that distribution of strain between adjacent rim sections may be provided for. To this end I construct the frame 5 in such manner that its side plates 7 and 8 are considerably spaced apart near their periphery, as by the interposition between such plates of a solid central block 18 of wood or the like, stopping short of the internal surfaces of the rims 7' and 8' to leave within the rigid frame an annular chamber 19. In the opposite side walls of this chamber are made arcuate apertures 20, 20', arranged in staggering relation, and each struck on an arc from a pivot 21 traversing the chamber 19, such pivot giving support to a compensator or rocking bearing block 22, generally sector shaped, and of such configuration as to provide a long bearing entirely traversing the chamber upon the pivot 21, a body part of slightly less than half the thickness of the chamber, and a boss 22' extending through the arcuate aperture 20. Thus the successive bearing members 22, disposed with their bodies on opposite sides of the median line of the chamber, work freely in the chamber to the extent of movement permitted by their slots, without interference with each other.

To the opposite extremities of each boss 22' are connected two springs 25, preferably of similar shape, each extending, preferably in a simple curve or bow, from its point of attachment to the bearing member to such rim section as has its center in radial line therewith when said block is in mid-position in its slot or aperture. To receive the outer end of the spring 25 each rim section 13 is provided with an internal sleeve 13' traversing it about the middle of its length. Thus it will be understood that two adjoining rim sections are connected to a bearing member 22 on one side of the wheel and the next pair is connected to a bearing member or compensator on the opposite side of the wheel and so on throughout the entire circumference of the wheel. Thus it will be seen that as between a pair of rim sections bearing upon the plane of support at a given time, the rim section which is moved in farthest and has its spring 25 compressed to the greatest extent, through said spring applies power to the bearing member 22, tending to tilt it, as is well shown at X in Fig. 1, to a position to divide the strain with the remaining rim section of the pair. This same division of strain between the two springs appurtenant to a pair of rim sections occurs when one rim section is either making or leaving contact with the supporting surface in advance of its fellow. Thus as one rim section of a pair comes down into contact with the supporting surface and has weight impressed thereon in the rotation of the wheel, it immediately applies force of the compensator 22 forcing it over to compress the spring appurtenant to the other section of the pair; and conversely, as one rim member of a pair leaves contact with the supporting surface and reaches its limit of outward movement, its spring takes some of the strain from the spring of its fellow which is still in engagement with the supporting surface.

While I believe this arrangement to be new, it will be understood that I do not desire to limit my invention to this compensating construction in the broader aspects of my invention.

As a further refinement of my invention I preferably encompass the entire sectional rim with a suitable flexible covering, or tire, such as a leather band, 27, faced with rubber as at 28, and preferably I further arrange the rigid frame member in such a way that it may readily be bolted to the hub of an ordinary artillery wheel, suggestively shown at 29, by bolts 30, although obviously any suitable form of hub may be employed.

Having thus described my invention, what I claim is:

1. In a wheel, a rigid frame, rocking members carried by the frame, springs connected on opposite extremities of said rocking members, connected to different rim sections, and tending to press them normally outward from the frame, and connections between the rim sections and the frame restraining their outward movement but permitting them to yield inwardly relative to the frame.

2. In a wheel, the combination of a rigid frame, rocking members carried by said frame, a rim composed of sections and a band of flexible material surrounding said sections secured against outward movement upon the frame but yieldable inwardly relative thereto, and springs arranged in pairs, each pair connecting a pair or adjoining rim sections to opposite extremities of a rocking member.

3. In a wheel, a frame comprising side members disposed to leave therebetween an annular chamber having suitable openings in its sides, pivots traversing said chamber, rocking blocks mounted on said pivots, rim sections, means connecting said rim sections to the rigid frame to restrain them against outward or rotative movement with respect to the frame but to permit them to move inwardly, and curved springs arranged in pairs connecting a pair of adjacent rim sections to opposite ends of each rocking member.

In testimony whereof I hereunto set my hand in the presence of two witnesses.

WILLIAM L. MARTIN.

In the presence of—
 Forée Bain,
 Mary F. Allen.